United States Patent
Kotanides, Jr.

(10) Patent No.: US 7,503,363 B2
(45) Date of Patent: Mar. 17, 2009

(54) BELT PACKAGE FOR SUPER SINGLE TRUCK TIRES

(75) Inventor: John Kotanides, Jr., Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 239 days.

(21) Appl. No.: 11/093,635

(22) Filed: Mar. 30, 2005

(65) Prior Publication Data
US 2006/0225826 A1  Oct. 12, 2006

(51) Int. Cl.
*B60C 9/22* (2006.01)
*B60C 9/18* (2006.01)

(52) U.S. Cl. .......................... 152/531; 152/533; 152/538

(58) Field of Classification Search ................. 152/451, 152/527, 531, 533, 538
See application file for complete search history.

(56) References Cited

U.S. PATENT DOCUMENTS

| | | | |
|---|---|---|---|
| 4,791,973 A | 12/1988 | Davisson | |
| 4,869,307 A | 9/1989 | Bormann et al. | |
| 4,890,659 A | 1/1990 | Harakon et al. | |
| 4,944,821 A * | 7/1990 | Nishikawa et al. | 152/451 X |
| 5,014,762 A | 5/1991 | Beer et al. | |
| 5,115,853 A | 5/1992 | Oare et al. | |
| 5,616,195 A * | 4/1997 | Marquet et al. | |
| 5,849,121 A | 12/1998 | Reuter | |
| 6,016,857 A | 1/2000 | Roesgen et al. | |
| 6,016,858 A | 1/2000 | Roesgen et al. | |
| 6,082,423 A | 7/2000 | Roesgen et al. | |
| 6,135,181 A | 10/2000 | Paonessa et al. | |
| 6,135,183 A | 10/2000 | Oare et al. | |
| 6,439,283 B1 | 8/2002 | Paonessa et al. | |
| 6,474,384 B1 | 11/2002 | Iida | |
| 6,546,983 B1 | 4/2003 | Dyer | |
| 6,619,357 B1 * | 9/2003 | Gillard et al. | 152/531 |
| 6,668,889 B1 | 12/2003 | Losey et al. | |
| 6,709,540 B1 | 3/2004 | Oare et al. | |
| 6,799,618 B2 | 10/2004 | Reuter et al. | |
| 2002/0088551 A1 | 7/2002 | Beck, Jr. et al. | |
| 2003/0034107 A1 | 2/2003 | Westgate et al. | |
| 2004/0144470 A1 | 7/2004 | Oare et al. | |

FOREIGN PATENT DOCUMENTS

| | | |
|---|---|---|
| EP | 1 356 956 A2 | 10/2003 |
| JP | 9-240214 | 9/1997 |

OTHER PUBLICATIONS

European Search Report, completed May 9, 2006.

* cited by examiner

*Primary Examiner*—Adrienne C Johnstone
(74) *Attorney, Agent, or Firm*—Richard B. O'Planick

(57) ABSTRACT

A medium truck tire (10) and more specifically a super single truck tire (10) includes belt plies (23, 24, 25) reinforced with steel cords which make an angle comprised between 0° and 5° with respect to the equatorial plane. Disposed radially outermost over the belt plies (23, 24, 25) is at least one substantially full spiral helically wound layer (22). The steel of the reinforcing cords comprises high elongation steel. The spliced belt plies (23, 24, 25) are in a RLL configuration making angles comprised between 45° and 75° with respect to the equatorial plane angular direction of the inwardmost ply (25) oppositely disposed relative to the outer plies (23, 24). The helically would layer(s) (22) are disposed over the outermost L ply (23) and have a width substantially 100% of the footprint width of the tire tread.

1 Claim, 1 Drawing Sheet

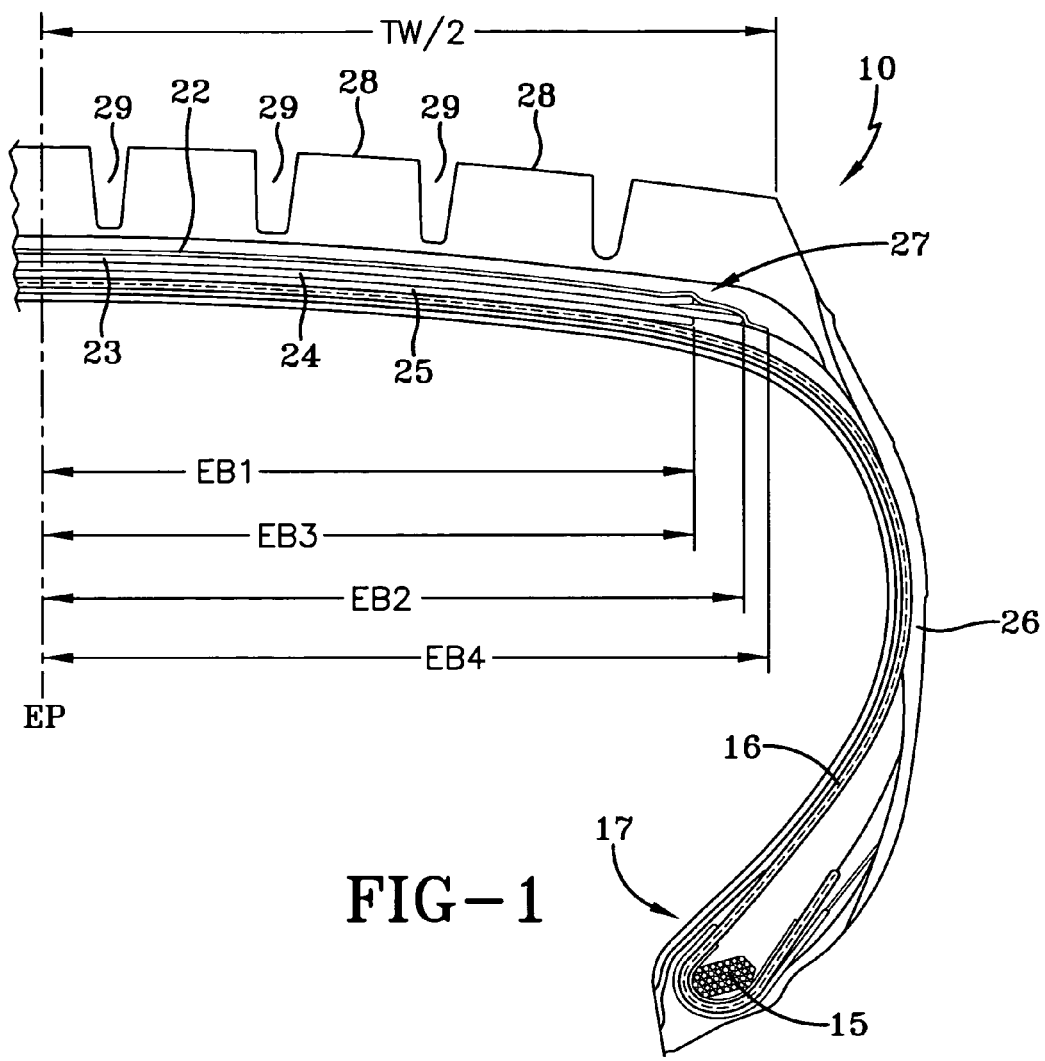
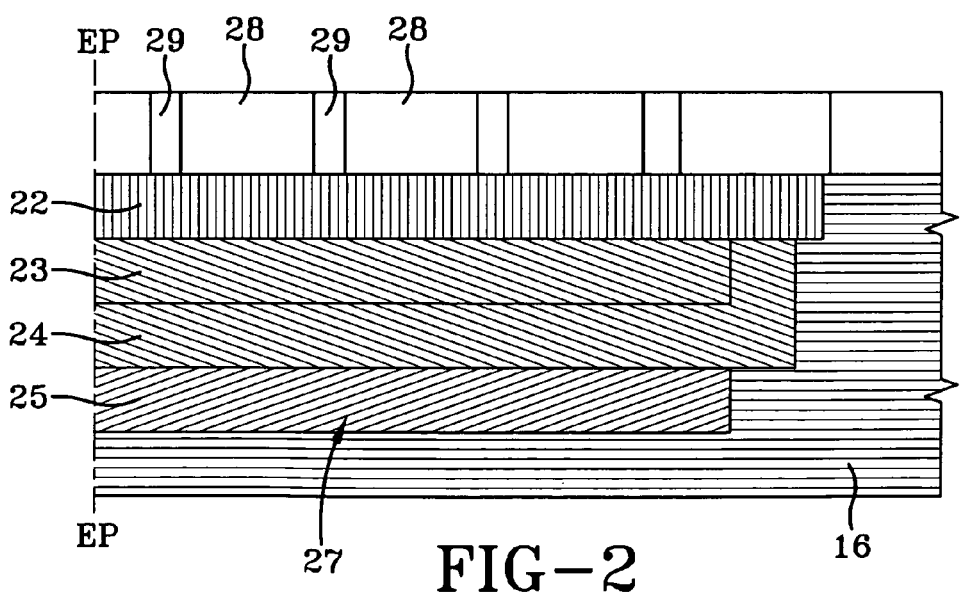

US 7,503,363 B2

BELT PACKAGE FOR SUPER SINGLE TRUCK TIRES

FIELD AND BACKGROUND OF THE INVENTION

The present invention relates to truck tires, preferably super single radial truck pneumatic drive tires.

Super single tires, which are wide base low aspect ratio truck tires replacing two small base tires, so-called dual mounted tires, have been used for years on trailers.

Over the years these wide base tires appeared more and more on trucks in the steering position because they had a higher mileage. Recently it became of interest to use also super single tires in the drive positions. Tires in the drive position have to bear part of the trailer load and must have an increased load capacity.

U.S. Pat. No. 6,619,357 discloses a belt package for a super single truck tire having steel cords and belt plies angled with respect to the equatorial plane and a helically wound belt ply on a carcass ply.

GB-A-1 567 614 discloses a pneumatic tire particularly suitable for heavy vehicles. Radially outwards of the belt layers there is at least one layer comprising metallic cords parallel to one another and substantially parallel to the circumferential direction. The metallic cords have an ultimate elongation between 4 and 8%. In a preferred embodiment the layers of extensible metallic cord are formed by a single helically wound cord.

It is known from LU-A-85 964 to wind a ribbon reinforced with cords helically in at least two layers on top the belt plies of a passenger tire. The ribbon has a width comprised between 15 and 45 mm. The reinforcing cords are preferably of nylon and have a lateral density of about 30 EPI.

FR-A-2 285 255 discloses a crown reinforcing structure for pneumatic tires including a helically wound ribbon reinforced with steel cords. The ribbon has a width comprised between 5 and 50 mm and is directly wound on the carcass ply.

While prior art tire constructions are functional and work well, there remains a continuing need for a low-weight tire construction that can considerably increase plysteer and improve crown durability, cornering force and high speed performance. Achievement of an improved low-weight tire construction providing such enhanced performance has, heretofore, proven problematic.

SUMMARY OF THE INVENTION

A pneumatic medium truck tire of the invention comprises at least one pair of parallel annular beads, at least one carcass ply wrapped around said beads, three to six belt plies disposed over the at least one carcass ply in a crown area of the tire, a tread disposed over the belts, and sidewalls disposed between the tread and the beads. According to one aspect of the invention, at least one layer of the belt plies is obtained by helically winding a spiral overlay. According to a further aspect of the invention, the at least one spiral overlay is radially outermost and disposed outward from a three belt ply reinforcement a RLL angled configuration. According to a further aspect of the invention, the spiral overlay layers may be achieved by a procedure in which the spiral wrap is applied with two turns at the shoulder, spirals across the tire to the other shoulder with two turns at that shoulder for one layer plus double coverage at the shoulder.

Pursuant to a further aspect of the invention specific constructions of such tires are also claimed.

Definitions

As used herein and in the claims, the terms "aspect ratio" means the ratio of the tire's section height to its section width;

"axial" and "axially" refer to directions which are parallel to the axis of rotation of a tire;

"radial" and "radially" refer to directions that are perpendicular to the axis of rotation of a tire;

"bead" refers to that part of a tire comprising an annular tensile member, the bead core, wrapped by ply cords and shaped, with or without other reinforcement elements to fit a designed tire rim;

"belt" or "belt ply" refers to an annular layer or ply of parallel cords, woven or unwoven, underlying the tread, not anchored to the bead;

"carcass" refers to the tire structure apart from the belt structure, tread, undertread, and sidewall rubber but including the beads, (carcass plies are wrapped around the beads);

"circumferential" refers to lines or directions extending along the perimeter of the surface of the annular tread perpendicular to the axial direction;

"crown" refers to substantially the outer circumference of a tire where the tread is disposed;

"equatorial plane (EP)" refers to a plane that is perpendicular to the axis of rotation of a tire and passes through the center of the tire's tread;

"footprint" refers to the contact patch or area of contact of the tire tread with a flat surface at zero speed and under normal load and pressure or under specified load, pressure and speed conditions;

"ply" means a continuous layer of rubber coated parallel cords;

"section height" means the radial distance from the nominal rim diameter to the outer diameter of the tire at its equatorial plane;

"section width" means the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands;

"spliced belt ply" refers to a ply that has the lateral sides extending across the whole lateral width of the belt, the circumferential ends being spliced and overlapping, forming a lap-splice or a butt-splice;

"super single tire" refers to a tire which replaces dual mounted tires on a specific axle; they are low aspect ratio tires and have a section width exceeding the section width of one of the previously dual mounted tires but inferior to the dual assembly width;

"tread width (TW)" means the arc length of the tread surface in the axial direction, that is, in a plane passing through the axis of rotation of the tire.

BRIEF DESCRIPTION OF THE DRAWINGS

FIG. 1 is a cross-sectional view of half a tire according to a preferred embodiment of the invention taken in a plane that contains the axis of rotation of the tire.

FIG. 2 illustrates a plan view of a portion of the crown reinforcing structure according to the embodiment shown in FIG. 1.

DETAILED DESCRIPTION OF THE INVENTION

With reference to FIG. 1, a preferred embodiment of the invention is illustrated. The pneumatic tire 10 comprises a pair of substantially parallel annular bead cores 15 located in beads 17 and a carcass ply 16. The carcass ply is wrapped over bead cores 15 and over a crown region of the tire at substantially 90 degrees with respect to the equatorial plane (EP) of the tire. Each bead comprises an apex, reinforcing plies such as chippers and flippers and gum strips as is well known in the tire art. A tread 28 comprising grooves 29 is disposed over a crown reinforcing or belt structure 27 and sidewalls 26 are arranged between the tread 28 and the beads 17. The carcass ply and belt plies, as is common in the art, are reinforced with substantially parallel longitudinal reinforcing members.

The crown reinforcing structure 27 pursuant to the invention is a low weight construction RLL with at least one spiral overlay. The structure 27 comprises three spliced belts plies 23, 24, and 25 reinforced with steel cords. The radially outer belt ply 23, as seen from FIG. 2, is reinforced with steel cords. The neighboring radially inner belt ply 24 is likewise reinforced with steel cords. The radially inwardmost belt ply 25 is reinforced with steel cords making an angle with respect to the equitorial plane generally at the same inclination but in the opposite direction as plies 23, 24. Radially outward of belt plies 23, 24, and 25 is a spirally wound belt structure 22 comprising, according to one aspect of the invention, a single (one) spirally wound layer strips extending transversely at least as far as the edges of the spliced belt plies 23, 24, and 25. The layer 22 comprises overlay strips preferably of non-steel belted material such as nylon. The spiral convolutions of the layer 24 make an angle of 0 degrees to 5 degrees with respect to the equatorial plane (EP) and are in abutment with any adjacent convolution, so as to form a continuous annular layer having a substantially even cord distribution across the axial width of the structure. The strips forming layer 22 are applied with two turns at the shoulder, spirals across the tire to the other shoulder with two turns at that shoulder for one layer plus double coverage at the shoulder.

Below is a table representing the reinforcement layers, angle, material, width, and percent of footprint width for the preferred embodiment of the invention. The belt (reinforcement) widths are based on footprint width of 14.80" for the specific tire listed in the subject. The table shows belt widths as a percentage of footprint width. Such percentages may be used generally if designing and incorporating the subject invention into other sized tires. However, the percentages may be varied if desired without departing from the spirit of the invention. For example, overlay strips of 25.4 mm width may be employed if preferred.

| REINFORCEMENT LAYER | ANGLE | MATERIAL | WIDTH | % OF FOOTPRINT WIDTH |
|---|---|---|---|---|
| BELT 4 (TOP) | 0 | NYLON | 14.80" | 100% |
| >1 Layer—Spiral wound strips 12.7 MM wide (a) | | | | |
| >Similar to Spiral-U (b) | | | | |
| BELT 3 | 18-19L | STEEL | 13.40" (340 MM) | 90% |
| BELT 2 | 18-19L | STEEL | 14.40" (366 MM) | 97% |
| BELT 1 (BOT) | 18-19R | STEEL | 13.40" (340 MM) | 90% |

(a) Note: overlay strips of 25.4 MM width also acceptable.
(b) Similar to Spiral-U = 2 turns at shoulder, spirals across tire to the other shoulder with 2 turns at that shoulder for one layer plus double coverage at shoulders.

An alternative embodiment of the present invention may be utilized incorporating the basic configuration shown in FIGS. 1 and 2 subject to the use of two full layers of full spiral overlay for layer 22. Radially outward of belt plies 23, 24, and 25 is a spirally wound belt structure 22 comprising two (two) spirally wound layers formed from strips extending transversely at least as far as the edges of the spliced belt plies 23, 24, and 25. The layers 22 comprise overlay strips preferably of nylon or other suitable elastomeric material. The spiral convolutions of the layers 22 make an angle of 0 degrees to 5 degrees with respect to the equatorial plane (EP) and are in abutment with any adjacent convolution, so as to form two continuous annular layers having a substantially even cord distribution across the axial width of the structure.

The strips forming layers 22 are applied starting at the center and spirals to a first shoulder; wrapping twice at the shoulder and spiral back across the tread to the other shoulder; spirals twice at that shoulder and then spirals back to the center for two full layers.

Below is a table representing the reinforcement layers, angle, material, width, and percent of footprint width for the alternative embodiment of the invention. The belt (reinforcement) widths are based on footprint width of 14.80" for the specific tire listed in the subject. The table shows belt widths as a percentage of footprint width. Such percentages may be used generally if designing and incorporating the subject invention into other sized tires. However, the percentages may be varied if desired without departing from the spirit of the invention. For example, overlay strips of 25.4 mm width may be employed if preferred.

From the foregoing, it will be appreciated that the subject construction is an enhanced RLL with at least one full spiral overlay layers radially outward of the three reinforcement belts. The resultant construction increases plysteer significantly and improves crown and high speed characteristics with a full width overlay zero-degree layer 24 and R-L-L layup. A reduction in weight may be achieved by the elimination of layer ⅔ wedge gage. The spiral overlay is preferably formed from nylon material having gages that range from 0.030" to 0.090". Such a construction is particularly suited for line haul drive and trail SUSI tires similar to the 445/50R22.5 but may also be used in mixed service super single tires such as the 385, 425, and 445/65R22.5 sizes. The invention thus is not intended to be constrained or limited by tire size or application. Additionally, the subject invention may apply to wide tires such as 315/80R.22.5 or other tires where improvements for weight, fuel efficiency, wear, and handling are desired.

While the invention has been specifically illustrated and described, those skilled in the art will recognize that the invention may be variously modified and practiced without departing from the spirit of the invention. The scope of the invention is limited only by the following claims.

What is claimed is:

1. A pneumatic super single radial truck tire (10) of the type having at least one pair of parallel annular beads (17), at least one carcass ply (16) wrapped around said beads, a crown reinforcing structure comprising radially spaced spliced belts plies and a helically wound belt ply in a crown area of said tire, tread (28) disposed over said crown reinforcing structure, and sidewalls (26) disposed between said tread and said beads, characterized in that the belt plies comprise a least three ply layers (23, 24, 25) and at least one radially outermost helically wound layer (22) located radially outward of the ply layers in a full spiral overlay wherein the width (EB1) of the inwardmost belt (25) is about 90% of a footprint width of the tire tread; the width (EB2) of the next radially outward layer (24) is about 97% of a footprint width of the tire tread; the width (EB3) of the next radially outward layer (23) is about 90% of the footprint width of the tire tread; and the width (EB4) of a helically wound outermost belt (22) is about 100% of the footprint width of the tire tread.

* * * * *